United States Patent
Stewart

(10) Patent No.: US 8,471,679 B2
(45) Date of Patent: Jun. 25, 2013

(54) ELECTRONIC DEVICE INCLUDING FINGER MOVEMENT BASED MUSICAL TONE GENERATION AND RELATED METHODS

(75) Inventor: Arthur Leslie Stewart, Melbourne Beach, FL (US)

(73) Assignee: Authentec, Inc., Melbourne, FL (US)

( * ) Notice: Subject to any disclaimer, the term of this patent is extended or adjusted under 35 U.S.C. 154(b) by 749 days.

(21) Appl. No.: 12/259,493

(22) Filed: Oct. 28, 2008

(65) Prior Publication Data

US 2010/0102939 A1    Apr. 29, 2010

(51) Int. Cl.
*G05B 19/00* (2006.01)
*G10H 1/00* (2006.01)

(52) U.S. Cl.
USPC ...... 340/5.83; 340/5.82; 340/384.1; 382/124; 382/115; 84/600

(58) Field of Classification Search
USPC ............. 340/384.1, 5.83, 5.82, 5.81, 5.8, 340/5.1, 1.1, 124; 345/156; 382/124, 115, 382/100; 455/3.06; 84/600
See application file for complete search history.

(56) References Cited

U.S. PATENT DOCUMENTS

| | | | | |
|---|---|---|---|---|
| 4,782,455 | A | 11/1988 | Morinouchi et al. | 364/569 |
| 6,628,377 | B1 * | 9/2003 | Sabatini et al. | 356/71 |
| 6,681,120 | B1 | 1/2004 | Kim | 455/556 |
| 6,773,344 | B1 | 8/2004 | Gabai et al. | 463/1 |
| 7,188,005 | B2 | 3/2007 | Toba et al. | 701/1 |
| 7,197,168 | B2 | 3/2007 | Russo | 382/125 |
| 7,275,252 | B2 | 9/2007 | Volk et al. | 720/630 |
| 2003/0053665 | A1 * | 3/2003 | Hamid | 382/124 |
| 2004/0081339 | A1 * | 4/2004 | Benkley, III | 382/124 |
| 2004/0131237 | A1 * | 7/2004 | Machida | 382/124 |
| 2004/0242325 | A1 | 12/2004 | Levitan et al. | 463/41 |
| 2005/0089202 | A1 * | 4/2005 | Setlak et al. | 382/124 |
| 2005/0105782 | A1 | 5/2005 | Abiko | 382/124 |
| 2005/0126370 | A1 * | 6/2005 | Takai et al. | 84/636 |
| 2005/0192078 | A1 | 9/2005 | Jawaharlal | 463/17 |
| 2005/0244039 | A1 | 11/2005 | Geoffroy et al. | 382/126 |
| 2006/0140458 | A1 * | 6/2006 | Cheng et al. | 382/124 |
| 2006/0182319 | A1 * | 8/2006 | Setlak et al. | 382/124 |
| 2007/0137462 | A1 * | 6/2007 | Barros et al. | 84/453 |
| 2007/0186752 | A1 * | 8/2007 | Georges et al. | 84/609 |
| 2007/0274575 | A1 | 11/2007 | Russo | 382/124 |
| 2010/0237991 | A1 * | 9/2010 | Prabhu et al. | 340/5.83 |

FOREIGN PATENT DOCUMENTS

WO    WO 0228067 A1 *    4/2002

OTHER PUBLICATIONS

Electronic Products, "Choosing Fingerprint Sensors for Advanced Security", http://www2.electronicproducts.com/PrintArticle.aspx?ArticleURL=authentec.apr2006.html, pp. 1-4.
Zeemote, Inc, "About Zeemote, Inc.", http://zeemote,com/company.html, 2008, pp. 1 of 1.

* cited by examiner

*Primary Examiner* — Daniel Wu
*Assistant Examiner* — Kam Ma
(74) *Attorney, Agent, or Firm* — Allen, Dyer, Doppelt, Milbrath & Gilchrist, P.A.

(57) ABSTRACT

An electronic device may include a finger biometric sensor and an audio output transducer. The electronic device may further include a controller cooperating with the finger biometric sensor for determining at least one biometric characteristic of a user's finger. The controller may also cooperate with the finger biometric sensor for causing the audio output transducer to generate at least one musical tone changing based upon movement of a user's finger relative to the finger biometric sensor.

16 Claims, 3 Drawing Sheets

ELECTRONIC DEVICE INCLUDING FINGER MOVEMENT BASED MUSICAL TONE GENERATION AND RELATED METHODS

FIELD OF THE INVENTION

The present invention relates to the field of electronic devices, and, more particularly, to such devices providing musical tone generation.

BACKGROUND OF THE INVENTION

Entertainment options offered on a mobile wireless communications device have become increasingly popular. For example, the ability to select custom ring tones, skins, and the ability to play MP3 music files are a few of the entertainment options typically offered on a mobile wireless communications device. Another form of entertainment typically included on a mobile wireless communications device is a game. One particularly popular game, for example, is Snake, offered on Nokia brand mobile wireless communications devices. While an early version of the Snake game was controlled by a 4-way directional input, the game remains popular, with a latest version being released on May 22, 2008 for the Nokia N-Gage mobile gaming platform that includes two dedicated gaming buttons.

The Zeemote JS1 Controller available from Zeemote, Inc. of Bedford, Mass., is a wireless game controller or joystick that communicates via Bluetooth wireless technology to a mobile wireless communications device.

U.S. Pat. No. 7,275,252 to Volk et al. discloses a mobile wireless communications device that includes a microminiature optical disc drive. The microminiature optical disc drive provides a data source for playing games, movies, or other digital content on the device.

U.S. Patent Application Publication No. 2005/0192078 to Jawaharlal is directed to a system and method for wireless remote access based gaming for lottery games. According to one embodiment, a remote user terminal transmits a first gaming SMS text message via a wireless network to an application server, and the application server transmits a second gaming SMS text message via the wireless network to the remote user terminal.

U.S. Pat. No. 6,681,120 to Kim is directed to a mobile entertainment and communication device that communicates over the internet and includes one or more replaceable memory card sockets for receiving a blank memory card for recording data directly from the internet. Musical performances may also be recorded and can be selectively reproduced by the device for the enjoyment of the user. The device also includes a camera and microphone for recording images and sound within the range of the device that can be wirelessly transmitted, either selectively or automatically to a remote telephone. Further, the device includes sensors for sensing unusual conditions that may also be transmitted to a remote telephone, together with the location of the device as determined by a GPS section of the device.

With entertainment, such as games, on a mobile wireless communications device becoming increasingly popular, it may be desirable to include additional features on a mobile wireless communications device for entertainment purposes.

SUMMARY OF THE INVENTION

In view of the foregoing background, it is therefore an object of the present invention to provide of an electronic device including an entertainment feature, such as musical tone generation, for example.

This and other objects, features, and advantages in accordance with the present invention are provided by an electronic device including a finger biometric sensor, an audio output transducer, and a controller. The controller may cooperate with the finger biometric sensor for determining at least one biometric characteristic of a user's finger. The controller may also cooperate with the finger biometric sensor for causing the audio output transducer to generate at least one musical tone changing based upon movement of a user's finger relative to the finger biometric sensor, for example. Accordingly, the electronic device provides a user with musical entertainment using a finger biometric sensor. Of course, the finger biometric sensor may also be used for authentication and/or navigation functions as well.

The controller may cooperate with the finger biometric sensor for causing the audio output transducer to generate the at least one musical tone changing based upon a velocity of the user's finger relative to the finger biometric sensor. Additionally, the controller may cooperate with the finger biometric sensor for causing the audio output transducer to generate the at least one musical tone having a pitch that changes based upon the movement of the user's finger relative to the finger biometric sensor, for example. Still further, the controller may permit selecting a musical instrument for the at least one musical tone.

The finger biometric sensor may include a slide biometric finger sensor, for example. The controller may generate a finger velocity signal based upon the slide biometric finger sensor. The controller may cooperate with the slide finger biometric sensor for causing the audio output transducer to generate the at least one musical tone changing based upon the finger velocity signal.

The electronic device further may include a wireless link coupling the audio output transducer and the controller, for example. The electronic device may also include at least one of a display and a keypad coupled to the controller.

Another aspect is directed to a method of playing at least one musical tone using an electronic device. The electronic device may include a finger biometric sensor, an audio output transducer, and a controller coupled to the finger biometric sensor and the audio output transducer. The method may include using the controller cooperating with the finger biometric sensor for determining at least one biometric characteristic of a user's finger, for example. The method may also include further using the controller, also cooperating with the finger biometric sensor for causing the audio output transducer to generate the at least one musical tone changing based upon movement of the user's finger relative to the finger biometric sensor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
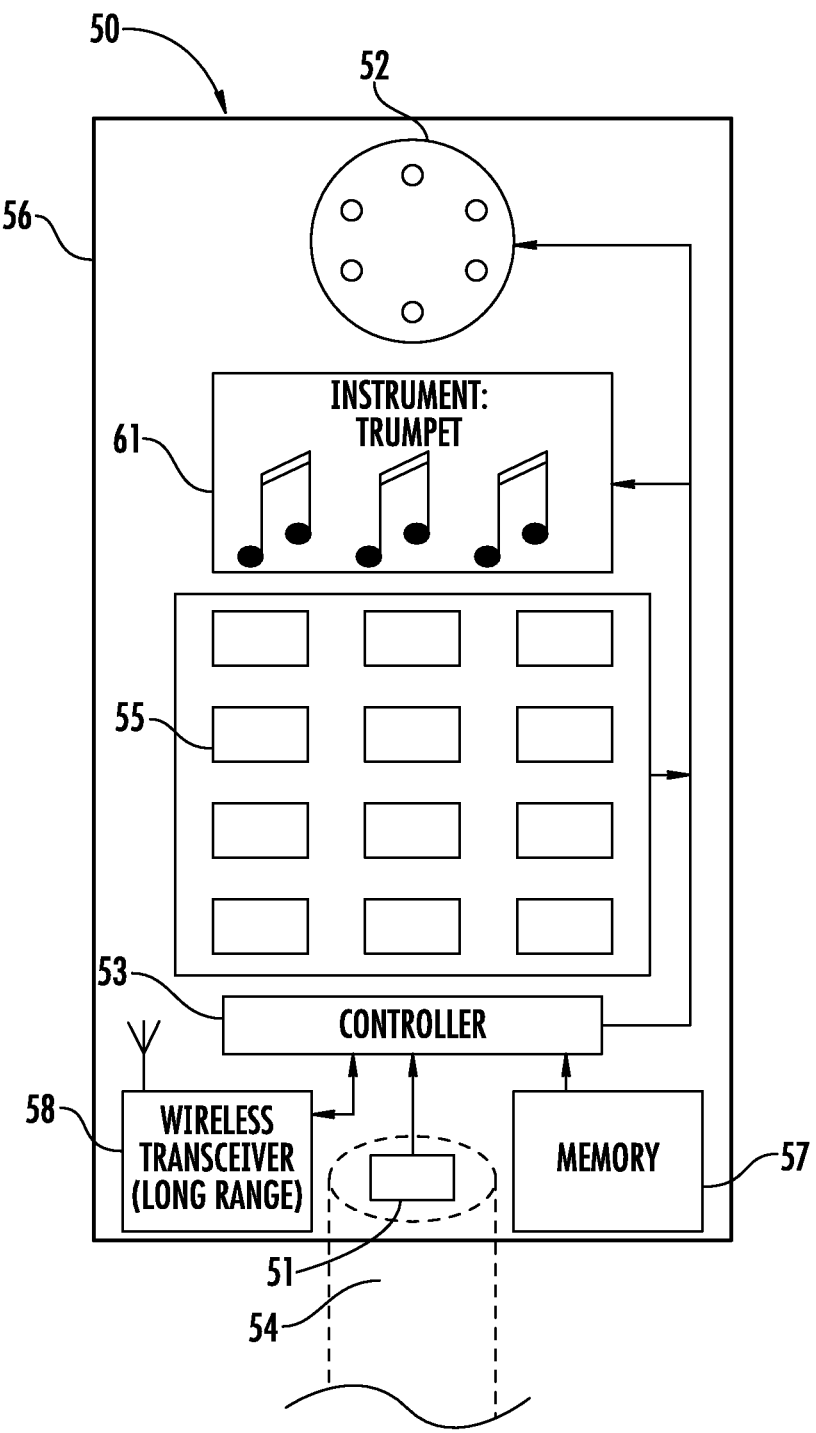
FIG. 1 is a schematic block diagram of an electronic device in accordance with the invention.

Referring initially to FIG. 1, an electronic device 50 includes a finger biometric sensor 51, an audio output transducer 52, and a controller 53. The controller 53 cooperates with the finger biometric sensor for determining at least one biometric characteristic of a user's finger 54. The electronic device 50 is illustratively a mobile telephone and it includes a cellular transceiver 58, or other type of wireless transceiver as will be appreciated by those skilled in the art. Other mobile wireless communications devices, such as a personal digital assistant (PDA), for example, may be used.

The finger biometric sensor 51 may be a slide fingerprint sensor available from AuthenTec, Inc. of Melbourne, Fla. and the assignee of the present application. Other types of fingerprint sensors may also be used.

The controller 53 cooperates with the finger biometric sensor 51 for causing the audio output transducer 52 to generate at least one musical tone changing based upon movement of the user's finger 54 relative to the finger biometric sensor. In other words, movement of the user's finger 54 over the finger biometric sensor 51 causes the controller 53 to generate a signal or measurement that corresponds to a different musical tone. The signal or measurement generated by the controller 53 may be of a velocity of the user's finger 54 relative to the finger biometric sensor, and the musical tone may change based on that velocity.

As will be appreciated by those skilled in the art, the signal or measurement generated by the controller 53 may be a shared signal or measurement, or be part of image processing for the finger biometric sensor 51, for example a signal used for navigation and/or authentication functions. While the changing of the musical tone may be based on the velocity of the user's finger 54 relative to the finger biometric sensor, other movement-based signals or measurements may also be used to change the musical tone.

The controller 53 also cooperates with the finger biometric sensor 51 for causing the audio output transducer 52 to generate the musical tone having a pitch, or frequency, that changes based upon the movement or velocity of the user's finger 54 relative to the finger biometric sensor 51. Of course, the musical tone may have other attributes that may change based upon the velocity of the user's finger 54 relative to the finger biometric sensor 51. The musical tone attribute to be changed based on the velocity of the user's finger 54 may be selected by the user using the keypad 55 of the electronic device 50. It should be understood by those skilled in the art that, in addition to a dialing function of the electronic device 50, the keypad 55 may be used for menu item selection. However, as will be appreciated by those skilled in the art, the controller 53 may also cooperate with the finger biometric sensor 51 to provide a navigation function, such as menu item selection and/or an authentication function.

Additionally, the controller 53 may permit selecting a musical instrument for the musical tones. In other words, the musical tone generated by the audio output transducer 52 may be representative of a trumpet, for example, or other user selected instrument. The user may select the instrument using the keypad 55 of the electronic device 50, similar to the musical tone attribute selection, as described above.

In some embodiments, as the velocity of the user's finger 54 across or in relation to the finger biometric sensor 51 increases, the pitch of the selected instrument is increased. In other words, the faster the swipe of the user's finger 54, the higher the note or frequency generated by the audio output transducer 52. Other relationships between the velocity of the user's finger 54 in relation to the finger biometric sensor 51 and the pitch may be used. For example, a higher velocity of the user' finger 54 in relation to the finger biometric sensor 51 may correspond to a lower pitch.

As will be appreciated by those skilled in the art, the controller 53 may be included in an integrated processor that may be carried in the housing 56 of the electronic device 50.

The cooperation of the controller 53 with the finger biometric sensor 51 to cause the audio output transducer 52 to generate a musical tone advantageously provides a user with entertainment value. Indeed, the user may combine a series of finger movements at different velocities to produce a song or special sound effect, for example.

The finger biometric sensor 51 is illustratively a slide sensor. In other words, biometric characteristics are determined by a sliding placement of the user's finger 54. Alternatively, the finger biometric sensor 51 may be a static biometric sensor. Using a slide biometric sensor, for example, may be advantageous, as the signal or measurement, such as a finger velocity signal, for example, typically used for image processing of the user's finger and generated by the controller, may also be used for causing the audio output transducer 52 to generate at least one musical tone changing based thereon. Suitable biometric sensors and associated processing are described, for example, in U.S. Published Application Publication No. 2005/0129291 to Boshra, and assigned to the assignee of the present application, the entire contents of which are herein incorporated by reference.

A memory 57 is illustratively coupled to the controller 53. The memory 57 advantageously stores the available musical tone attributes and musical instruments for the musical tone. The memory 57 may also include a library of sounds that correspond to each musical instrument. Additionally, programming instructions that may be executed by the controller 53 for causing the audio output transducer 52 to generate the musical tone changing based upon movement of the user's finger 54 relative to the finger biometric sensor 51 may also be stored on the memory 57. In one embodiment, the controller 53 may include software, or a sound generator application that may be loaded into the memory 57. In some embodiments, the memory 57 may also be used for recording and playback of musical tones.

The memory 57 may be included in the controller 53, for example, or may be external to the controller, as illustrated in FIG. 1. This advantageously permits the sound generator application or musical tone information to be installed on the electronic device 50 as an added option by the user.

A display 61 is also included in the electronic device 50. The display 61 cooperates with the controller 53 to display information related to the musical tone. For example, the display 61 may indicate which musical instrument is currently selected, the musical tone attribute that is also currently selected, and/or the musical note corresponding to the last movement of the user's finger 54. Of course, the display 61 may display other information relating to the musical tone, such as equalizer bars, or a visual splash screen that corresponds to the musical tones. The display 61 may be the display of the electronic device 50 and also display information relating to the operation of the electronic device. This arrangement advantageously maintains a reduced overall size of the electronic device 50 while adding additional functionality.

The audio output transducer 52 is also illustratively coupled to the controller 53. The audio output transducer 53 may be the electronic device speaker, for example, thus maintaining reduced overall size of the electronic device 50 while adding additional functionality.

Figure 2:
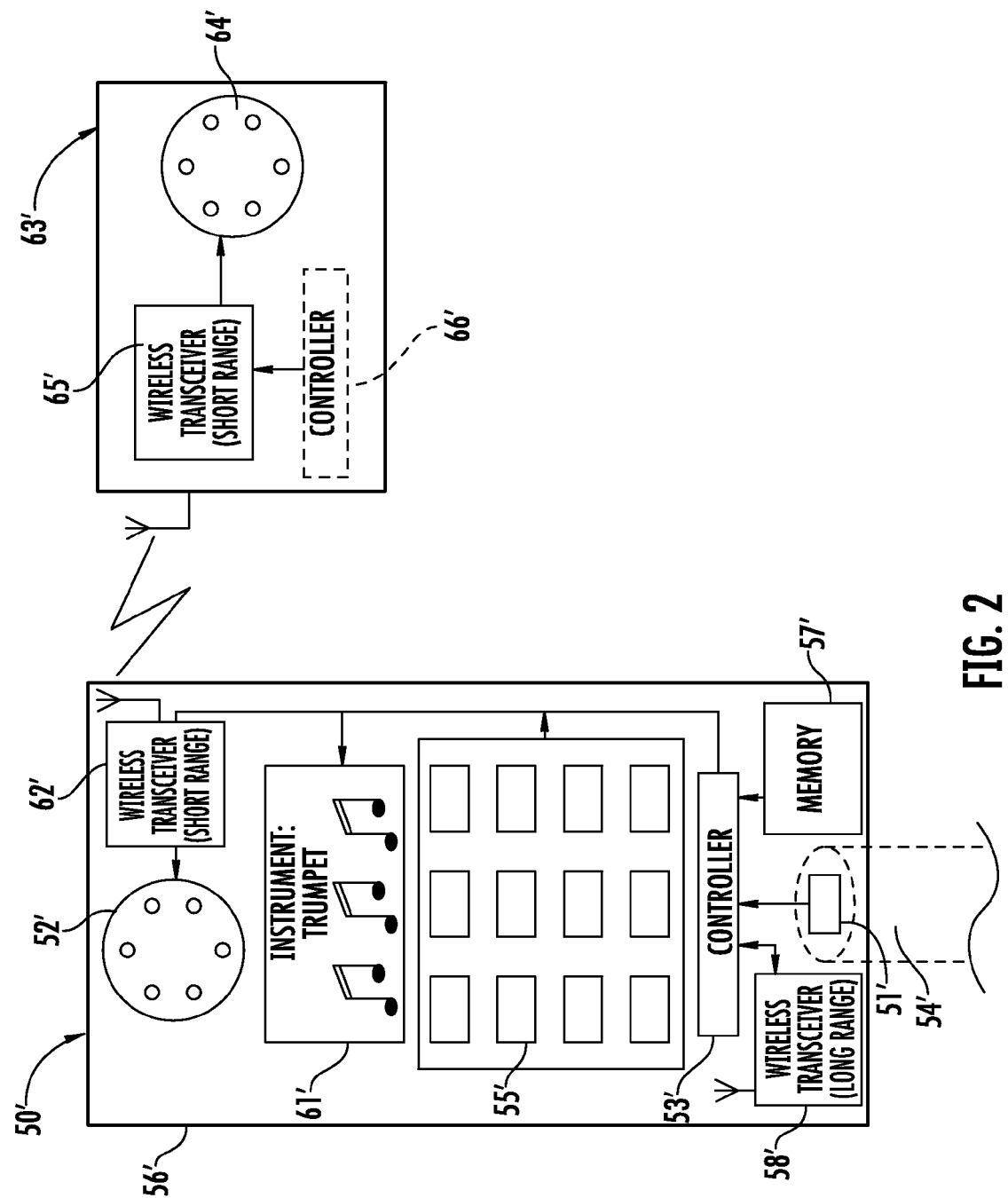
FIG. 2 is a schematic block diagram of another embodiment of the electronic device of FIG. 1

Referring now to FIG. 2, in another embodiment, a remote audio output device 63' that includes a remote audio output transducer 64' is outside the housing 56' of the electronic device 50'. For example, the remote audio output device 63' may be a wireless headset, wireless earpiece, or other external wireless audio output device, as will be appreciated by those skilled in the art. The remote audio output device 63' illustratively includes a remote wireless transceiver 65' that is coupled to the remote audio output transducer 65' that generates the musical tones. A remote audio output device controller 66' may also be optionally included for processing the musical tones received from the remote wireless transceiver 65'. However, the functions of the controller 66' may be included in the remote wireless transceiver 65'.

Additionally, the electronic device 50' illustratively includes an electronic device wireless transceiver 62' coupling the audio output transducer 52' and the controller 53'. The electronic device wireless transceiver 62' establishes a short range wireless link with the remote wireless transceiver 63'. The short range wireless link may be a Bluetooth link, for example, or other wireless link, as will be appreciated by those skilled in the art.

Musical tones that are to be generated by the audio output transducer 52' are transmitted over the wireless link to the remote wireless transceiver 65'. The remote wireless transceiver 65' processes the received musical tones and the remote audio output transducer 64' remotely generates the musical tones. The musical tones may additionally be generated on the audio output transducer 52'.

Figure 3:
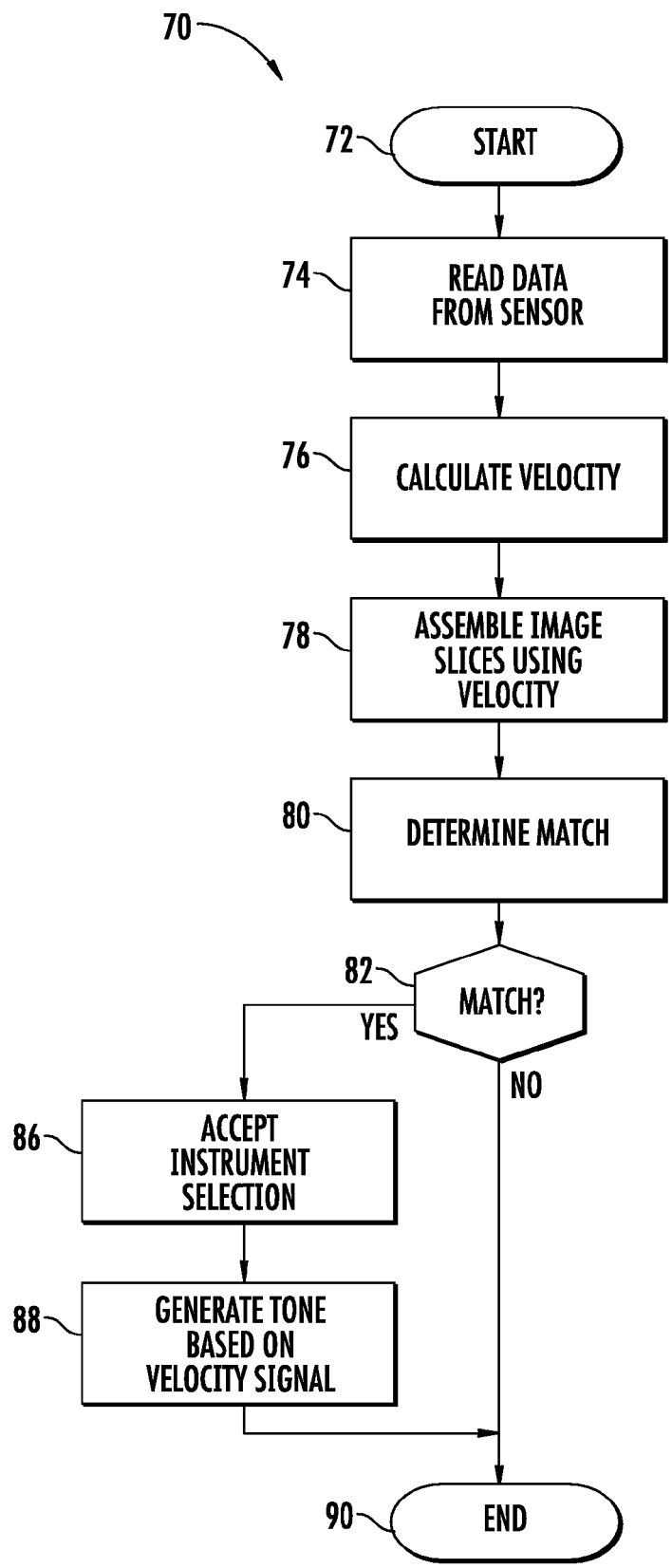
FIG. 3 is a flow chart of a method of playing a musical tone in accordance with the invention.

Referring now additionally to FIG. 3, a method for playing a musical tone using an electronic device 50 is described with reference to flowchart 70. The electronic device 50 includes a finger biometric sensor 51, an audio output transducer 52, and a controller 53 coupled to the finger biometric sensor and the audio output transducer. Beginning at Block 72, the method includes using the controller 53 to cooperate with the finger biometric sensor 51 to determine a biometric characteristic from the user's finger 54. Determining the biometric characteristic may include reading data from the finger biometric sensor at Block 74. The data may include image slices of the user's finger 54 and other data relating to the user's finger, as will be appreciated by those skilled in the art. The controller 53 is used to calculate the velocity of the user's finger 54 in relation to the finger biometric sensor 51 at Block 76, and generates a signal corresponding thereto. The velocity of the user's finger 54 is used to assemble the image slices (Block 78), The controller 53 is then used for authentication to determine a match of the image slices to the stored users' finger images (Block 80). The stored users' finger images may be stored in the controller 53, in the memory 57, or in both. If the controller 53 determines there is not a match at Block 82 between the user's finger image slices and the stored users' finger images, the method ends at Block 90.

In contrast, if the controller 53 determines there is a match at Block 82 between the user's finger image slices and the stored users' finger images, the controller then enables the device such as to accept the musical instrument selection made using the keypad 55, or may accept a default musical instrument selection, for generating the musical tone (Block 86). The controller 53 is then used to cooperate with the finger biometric sensor 51 for causing the audio output transducer 52 to generate the musical tone changing based upon the velocity signal (Block 88), before ending at Block 90.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a slide finger biometric sensor;
an audio output transducer; and
a controller cooperating with said slide finger biometric sensor for determining at least one biometric characteristic of a user's finger based upon a sliding motion of the user's finger across said slide finger biometric sensor and generating a finger velocity signal based upon a velocity of the sliding motion of the user's finger relative to said slide finger biometric sensor;
said controller assembling biometric data for the at least one biometric characteristic based upon the finger velocity signal;
said controller authenticating the user by determining a match between the assembled biometric data for the at least one biometric characteristic and at least one stored biometric characteristic;
said controller also cooperating with said slide finger biometric sensor for causing said audio output transducer to generate at least one musical tone changing based upon the finger velocity signal and the sliding motion of the user's finger across said slide finger biometric sensor.

2. The electronic device according to claim 1 wherein said controller cooperates with said slide finger biometric sensor for causing said audio output transducer to generate the at least one musical tone having a pitch that changes based upon the finger velocity signal.

3. The electronic device according to claim 1 wherein said controller also cooperates with said slide finger biometric sensor for performing at least one navigation function.

4. The electronic device according to claim 1 further wherein said controller permits selecting a musical instrument for the at least one musical tone.

5. The electronic device according to claim 1 further comprising a wireless link coupling said audio output transducer and said controller.

6. The electronic device according to claim 1 further comprising at least one of a display and a keypad coupled to said controller.

7. An electronic device comprising:
a finger biometric sensor;
an audio output transducer; and
a controller cooperating with said finger biometric sensor for determining at least one biometric characteristic of a user's finger based upon a sliding motion of the user's finger across said finger biometric sensor; said controller assembling biometric data for the at least one biometric characteristic based upon a velocity of the sliding motion of the user's finger relative to said finger biometric sensor;
said controller authenticating the user by determining a match between the assembled biometric data for the at least one biometric characteristic and at least one stored biometric characteristic;
said controller also cooperating with said finger biometric sensor for causing said audio output transducer to generate at least one musical tone having a pitch that changes based upon the velocity of the user's finger relative to said finger biometric sensor and the sliding motion of the user's finger across said finger biometric sensor.

8. The electronic device according to claim 7 further wherein said controller permits selecting a musical instrument for the at least one musical tone.

9. The electronic device according to claim 7 further comprising a wireless link coupling said audio output transducer and said controller.

10. The electronic device according to claim 7 further comprising at least one of a display and a keypad coupled to said controller.

11. A mobile wireless communications device comprising:
a housing;
a wireless transceiver carried by said housing;
a slide finger biometric sensor carried by said housing;
an audio output transducer carried by said housing; and
a controller cooperating with said slide finger biometric sensor for determining at least one biometric characteristic of a user's finger based upon a sliding motion of the user's finger across said slide finger biometric sensor, said controller for
generating a finger velocity signal based upon a velocity of the sliding motion of the user's finger relative to said slide finger biometric sensor,
assembling biometric data for the at least one biometric characteristic based upon the finger velocity signal,
authenticating the user by determining a match between the assembled biometric data for the at least one biometric characteristic and at least one stored biometric characteristic, and
enabling operation of said wireless transceiver based upon the authentication;
said controller also cooperating with said slide finger biometric sensor for causing said audio output transducer to generate at least one musical tone changing based upon the finger velocity signal and the sliding motion of the user's finger across said slide finger biometric sensor.

12. The mobile wireless communications device according to claim 11 wherein said controller cooperates with said slide finger biometric sensor for causing said audio output transducer to generate the at least one musical tone having a pitch that changes based upon the finger velocity signal.

13. The mobile wireless communications device according to claim 11 further wherein said controller permits selecting a musical instrument for the at least one musical tone.

14. A method of playing at least one musical tone using an electronic device comprising a slide finger biometric sensor, an audio output transducer, and a controller coupled to the slide finger biometric sensor and the audio output transducer, the method comprising:
using the controller cooperating with the slide finger biometric sensor for determining at least one biometric characteristic of a user's finger based upon a sliding motion of the user's finger across the slide finger biometric sensor and generating a finger velocity signal based upon a velocity of the sliding motion of the user's finger relative to the slide finger biometric sensor;
using the controller for assembling biometric data for the at least one biometric characteristic based upon the finger velocity signal;
using the controller for authenticating the user by determining a match between the assembled biometric data for the at least one biometric characteristic and at least one stored biometric characteristic; and further using the controller also cooperating with the slide finger biometric sensor for causing the audio output transducer to generate the at least one musical tone changing based upon the finger velocity signal and the sliding motion of the user's finger across the slide finger biometric sensor.

15. The method according to claim 14 wherein using the controller comprises using the controller to generate the at least one musical tone having a pitch that changes based upon the finger velocity signal.

16. The method according to claim 14 further comprising using the controller to permit selecting a musical instrument for the at least one musical tone.

\* \* \* \* \*